United States Patent [19]

Behrend

[11] Patent Number: 4,490,693
[45] Date of Patent: Dec. 25, 1984

[54] I.F. DELAY EQUALIZER FOR A UHF TV TRANSMITTER

[75] Inventor: William L. Behrend, Pittsburgh, Pa.
[73] Assignee: RCA Corporation, New York, N.Y.
[21] Appl. No.: 495,723
[22] Filed: May 18, 1983
[51] Int. Cl.$^3$ .......................... H04B 3/14; H03H 7/03
[52] U.S. Cl. .................. 333/28 R; 330/304; 358/186
[58] Field of Search .......................... 333/28 R, 28 T; 330/304, 302, 107, 126, 147, 151; 455/116, 129; 358/186

[56] References Cited

U.S. PATENT DOCUMENTS 3,794,935  2/1974  Tsuchiga et al. ............... 330/151 X
3,868,604  2/1975  Tongue ............................ 333/28 R
4,063,187  12/1977  Orchard ......................... 333/28 R X
4,275,358  6/1981  Winget ............................ 330/304 X
4,352,075  9/1982  Cunningham ..................... 333/28 R Primary Examiner—Paul Gensler
Assistant Examiner—Benny Lee
Attorney, Agent, or Firm—E. M. Whitacre; W. H. Meise; H. I. Steckler

[57] ABSTRACT

A group delay compensation circuit for a television transmitter comprises a signal source coupled to a series resonant circuit. A means is present for changing the resonant circuit Q without changing the amplitude of an output signal derived from the resonant circuit. A difference amplifier is coupled to the resonant circuit and to the signal source. The means can be a voltage divider and a variable resistor coupled to the divider. Changing the Q varies the group delay.

7 Claims, 3 Drawing Figures

I.F. DELAY EQUALIZER FOR A UHF TV TRANSMITTER

BACKGROUND OF THE INVENTION

The present invention relates to group delay equalizers, and more particularly to such equalizers as used in the I.F. portion of a UHF television transmitter.

Klystrons having multiple output cavity resonators are typically used in UHF television transmitters. The cavities cause group delay to vary across the passband of the desired channel, thereby distorting the television signal. In particular, the group delay characteristic has a double humped response. This causes "spiking" at abrupt luminance signal transitions, and causes the chroma signal to have a different group delay from that of the luminance signal.

Typical prior art compensation circuits use a circuit, usually located in the transmitter I.F. section, that has the inverse of klystron group delay characteristic. Since at the IF frequency (about 45 MHz) a passive group delay equalizer with a "flat" frequency response cannot be made due to unattainably high required coil Q, the prior art uses an active equalizer comprising two I.F. paths. A series tuned circuit having a transfer function of $T(j\omega)$ is in the first path, while the second path is a direct connection (except for a possible all-pass delay compensator network). The signals in the two paths are subtracted, with the signal from the tuned circuit first path having twice the amplitude of the signal in the direct connection second path. The resulting transfer function is $2T(j\omega)-1$, which can properly equalize the group delay.

Such an equalizer has several disadvantages. A group delay adjustment in the tuned circuit first path causes a signal level change at the output of the subtractor. This requires an amplitude control to be added, which control must be adjusted as the group delay control is changed. Also, an active circuit such as an emitter follower is typically used in the first path for isolation purposes, which emitter follower must have a stable gain.

It is therefore desirable to provide a delay compensation network that is easy to adjust and is stable.

SUMMARY OF THE INVENTION

A circuit comprising a signal source; a resonant circuit coupled to said source; first providing means for providing an output signal from said resonant circuit; and adjusting means coupled to said resonant circuit for adjusting the Q thereof without changing the amplitude of said output signal.

DETAILED DESCRIPTION

Figure 1:
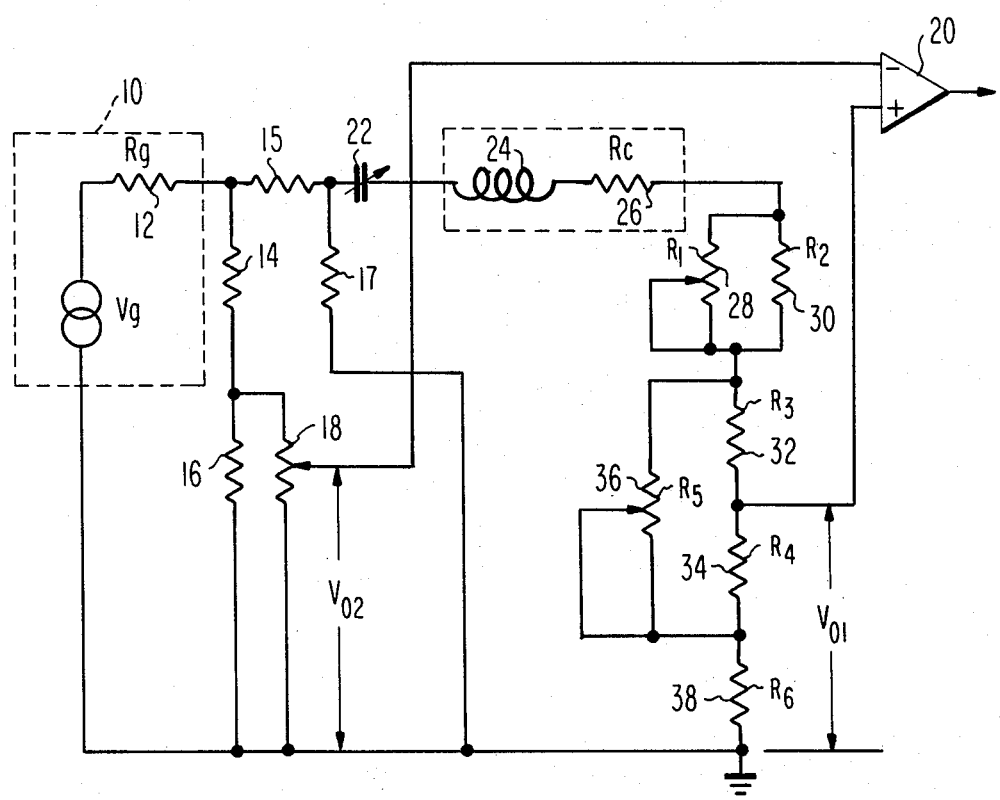
FIG. 1 is a diagram of an equalizer in accordance with the present invention.

FIG. 1 shows a generator 10 that provides a signal, such as a television I.F. signal of amplitude $V_g$, which generator 10 has an internal resistance 12 of value $R_g$. A voltage divider comprising fixed resistors 14 and 16, and potentiometer 18 is arranged across source 10. The tap of potentiometer 18 provides a voltage $V_{02}$ that is applied to the inverting input of difference amplifier 20.

The resistance of resistor 17 is close to the equivalent generator internal resistance required by a series resonant circuit connected to resistor 17 to provide the required Q of the series circuit. This resistance is small relative to the resistance of resistor 15 to ensure that the voltage at the junction of resistors 14 and 15 remains essentially constant with changing frequency causing $V_{02}$ to remain constant. Resistors 14, 15, 16, 17, and 18 provide a match to the generator impedance $R_g$.

The series resonant circuit has a transfer function $T(j\omega)$ and comprises variable capacitor 22, and inductor 24, which inductor 24 has an inherent resistance of value Rc represented by resistor 26. Coupled to inductor 24 is the parallel combination of variable resistor 28 and fixed resistor 30 having values of $R_1$ (when adjusted as explained below) and $R_2$ respectively. The series combination of fixed resistors 32 and 34 having respective values of $R_3$ and $R_4$, wherein $R_3 = R_4$, is coupled to resistors 28 and 30. The junction of resistors 32 and 34 provides voltage $V_{01}$ and is coupled to the non-inverting input of amplifier 20. Variable resistor 36 having a value of $R_5$ (when adjusted as explained below) is coupled across fixed resistors 32 and 34. Fixed resistor 38 is coupled between resistor 34 and the grounded side of generator 10. The output of amplifier 20 is heterodyned up to the UHF channel frequency by a converter (not shown) and applied to the klystron (not shown).

Figure 3:
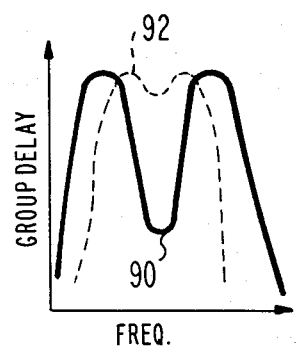
FIG. 3 is a graph of group delay versus frequency.

In operation, capacitor 22 is adjusted so that the resonant frequency of the series resonant circuit lies in the "dip" of the double-humped group delay characteristic (curve 90 in FIG. 3) of the klystron as downwardly frequency translated to the IF frequency. The resulting group delay characteristic is shown as curve 92 in FIG. 3. The value $R_1$ is then set so that the combination of $R_1$ in parallel with $R_2$ plus $R_c$ and the equivalent generator resistance, which is the combination of resistors 12, 14, 15, 16, 17, and 18 equals $R_6$. Since $R_3 = R_4$, the junction of resistors 32 and 34 is always one-half the voltage (as measured by resistance) between the top and bottom terminals of an equivalent generator regardless of the value $R_5$. Thus $V_{01}$ always equals one-half the equivalent generator voltage. The group delay Tg of a series resonant circuit at the resonant frequency $\omega_o$ is:

$$Tg = \frac{4Q}{\omega o},$$

wherein Q is the quality factor of the circuit. $R_5$ affects the value of Q and thus can be adjusted to achieve the desired group delay without, as stated above, changing $V_{01}$. Potentiometer 18 is then adjusted so that $V_{02} = V_{01}/2$. Thus at the output of amplifier 20 is a signal proportional to $2T(j\omega) - 1$, which is the required group delay compensation transfer function.

Figure 2:
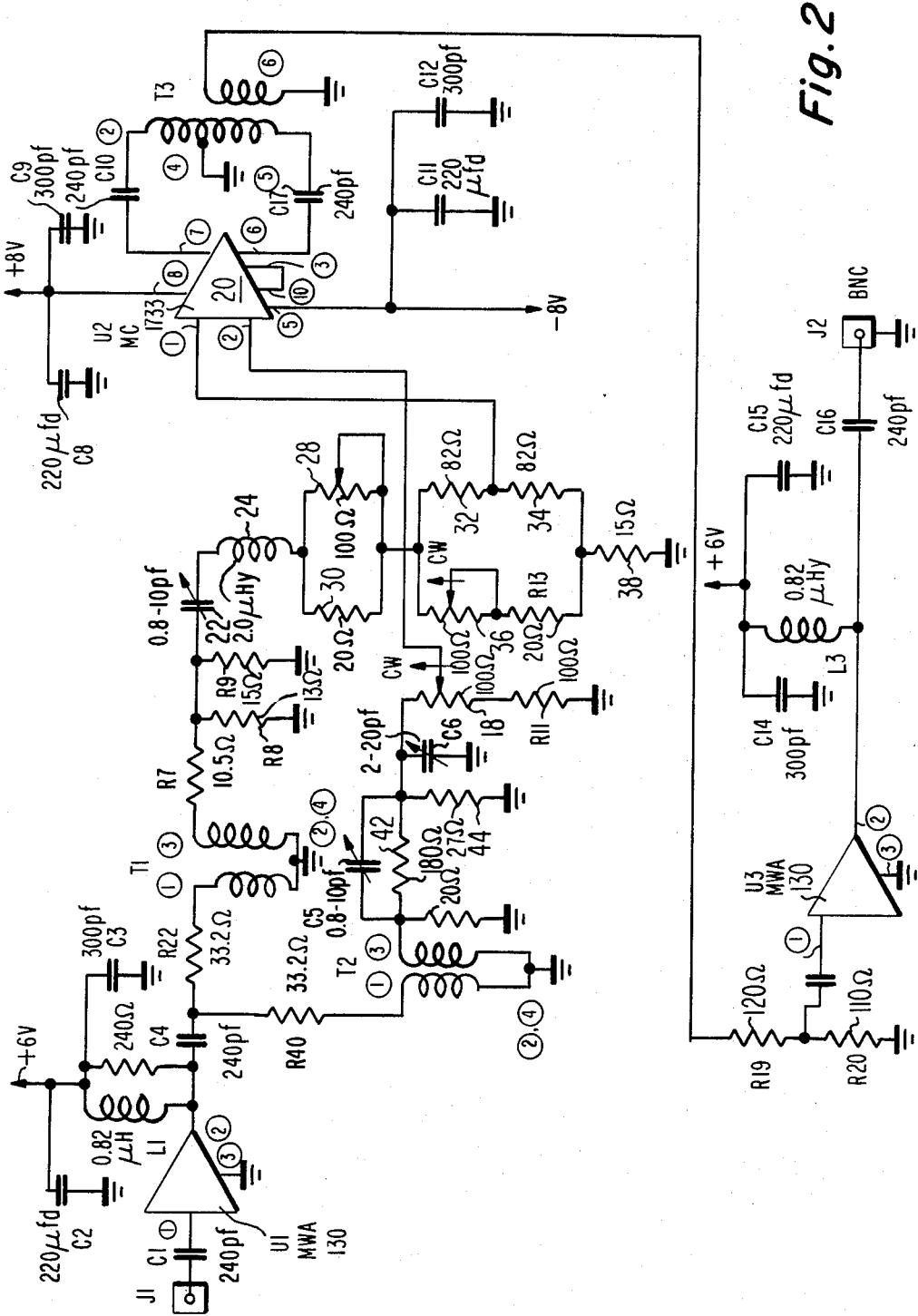
FIG. 2 is a detailed schematic diagram of an equalizer incorporating the invention.

FIG. 2 shows in detail an actual embodiment of the invention, which will be briefly described, and wherein corresponding reference numerals are used for corresponding elements and the circled numbers are IC (integrated circuit) and RF transformer pin numbers.

The IF input signal is present at jack J1. IC U1 has 50 ohm input and output impedances. The output impedance is matched by the series circuit comprising R22 and the T1 input impedance in parallel with the series circuit comprising R40 and the T2 input impedance.

These circuits provide signals to the two paths. The upper path having T1 is the series tuned circuit path. T1 is a very broad band transformer that is essentially resistive over a broad band of frequencies about the resonant frequency of the series circuit. Also, the circuit parasitic shunt capacities and series inductances are maintained small compared to desired component impedances. As ideally as possible, this circuit is made to be that of a series resonant circuit with the effective reactances, those of capacitor 22 and inductor 24. The series resonant frequency is determined by the reactances of elements 22 and 24, the effective generator voltage is constant and the generator impedance is resistive over the required bandwidth, and the remainder of the circuit is resistive.

The resistors R8 and R9 in parallel aid in causing the effective generator impedance to be small and resistive. Also, the impedance looking into the secondary of T1 is 27 ohms and with R7 the effective generator impedance is about 5.5 ohms.

At the series resonant frequency, resistor 28 is adjusted to make the sum of resistor 28 in parallel with resistor 30, plus the equivalent generator impedance and coil 24 losses equal to the resistance of resistor 38 (15 ohms). U2 at pin 1 presents a high impedance relative to the circuit impedances. At resonance, resistor 36 can be adjusted and the voltage at pin 1 of U2 remains constant. Adjustment of resistor 36 changes the Q of the resonant circuit and thus the group delay at the output of the equalizer.

For these circuit values, the Q can be changed from 5.6 to 11.6. The group delay at the resonant frequency $$T_g = \frac{4Q}{\omega_0}$$

is from 167 nsecs to 81 nsecs.

For these delay changes and circuit values, the voltage at the junction of R22 and R40 that drives the straight-through path changes 0.2% at the resonant frequency (44.286 MHz), with no change at band edge (41.55 MHz).

The lower path through T2 is the straight-through path and ideally should be resistive over the equalizer bandwidth. Parasitic reactances must be small relative to component design values. Also, the input impedance of U2, at pin 2, should be high relative to component values. However, as the circuits of the two paths cannot be made ideal and U2 and the circuits may not be an ideal differential amplifier, C5 and C6 are required in the second path. They provide a phase shift in either direction, as required, to provide the proper phasing of the two paths at the point of subtraction. To some extent, resistor 42, C5, resistor 44, and C6 are a compensated attenuator, but not exactly because they must provide a phase adjustment. Resistor 18 sets the level of the straight-through signal, at the summation point, to one-half the tuned circuit level at resonance.

Integrated circuit U2 is the differential amplifier 20. The differential outputs are combined in transformer T3. The values of R19 and R20 are determined by the required impedance at the primary of T3 and optimum drive to U3. U3 is a broadband amplifier with a 50 ohm output impedance.

What is claimed is:

1. A circuit comprising an equivalent voltage source having an equivalent internal resistance; a series resonant circuit coupled to said source and having an inductor and a capacitor, said inductor having an inherent resistance; a first resistor coupled to said resonant circuit; a first voltage divider coupled to said first resistor and including a pair of series connected equal value resistors; a variable resistor coupled in parallel with said voltage divider; a second resistor coupled between said voltage divider and said voltage source and having a resistance equal to the sum total of the resistances of said inherent resistance, said equivalent internal resistance, and said first resistor; and providing means for providing an output voltage from the junction of said pair of resistors relative to the junction of said second resistor and said voltage source; whereby said adjustable resistor can vary the Q of said circuit without changing said output voltage.

2. A circuit as claimed in claim 1, wherein said voltage source provides a television signal.

3. A circuit as claimed in claim 1, wherein said voltage source comprises a transformer.

4. A circuit as claimed in claim 1, further comprising a difference amplifier having a pair of inputs respectively coupled to said providing means and to said voltage source, whereby the group delay through said circuit is adjustable by varying the Q of said series resonant circuit.

5. A circuit as claimed in claim 4, wherein said voltage source is coupled to said difference amplifier through a second adjustable voltage divider.

6. A circuit as claimed in claim 5, wherein said second adjustable voltage divider provides a signal having an amplitude of one-half the amplitude of the signal from said providing means.

7. A circuit as claimed in claim 4, further comprising an adjustable phase shift network coupled between said difference amplifier and said voltage source.

* * * * *